United States Patent [19]
Chandler et al.

[11] 3,912,820
[45] Oct. 14, 1975

[54] PROCESS FOR THE PRODUCTION OF A CASEIN SUBSTITUTE

[76] Inventors: Keith L. Chandler, 807 Grove Ave., Barrington, Ill. 60010; Roy G. Hyldon, 177 Marion Parkway, Crystal Lake, Ill. 60014; John P. O'Mahony, 103 E. Lake Shore Drive, Barrington, Ill. 60010

[22] Filed: June 12, 1974

[21] Appl. No.: 478,762

[52] U.S. Cl. .................... 426/44; 426/46; 426/49; 426/52; 426/60
[51] Int. Cl.²..................... A23J 3/00; A23L 1/36
[58] Field of Search ............ 426/18, 44, 46, 49, 52, 426/60

[56] References Cited
UNITED STATES PATENTS

| | | |
|---|---|---|
| 2,502,482 | 4/1950 | Sair et al................................ 426/46 |
| 3,170,802 | 2/1965 | Fukushima............................ 426/46 |
| 3,694,221 | 9/1972 | Hoer et al............................. 426/46 |
| 3,810,997 | 5/1974 | Chien................................. 426/49 X |
| 3,852,480 | 12/1974 | Williams............................... 426/46 |

*Primary Examiner*—Raymond N. Jones

[57] ABSTRACT

A process is disclosed for producing a proteinaceous mixture having properties similar to casein and caseinate salts. The process comprises making an aqueous slurry of a carbohydrate containing vegetable protein material, fermenting the slurry with yeast to generate carbon dioxide, reacting the carbon dioxide with a hydroxide to form a carbonate, adjusting the pH, heating the slurry, and then blending the slurry with an unmodified proteinaceous material.

12 Claims, No Drawings

PROCESS FOR THE PRODUCTION OF A CASEIN SUBSTITUTE

BACKGROUND OF THE INVENTION

1. Field of the Invention

This invention relates to a process for producing a proteinaceous mixture having properties similar to casein and caseinate salts. The process involves the blending of an unmodified protein with a specially modified protein.

2. Description of the Prior Art

Many attempts have been made to provide proteinaceous mixtures having the properties of casein or caseinate salts. In recent years casein and caseinate salts as sodium caseinate have become very expensive due to many economic factors. Casein and sodium caseinate, however, have some exceptional properties which have not been suitably duplicated heretofore by modified vegetable proteins or mixtures of proteins. For instance, sodium caseinate has excellent binding and thermoplastic properties as well as having a good protein equivalency. The combination of protein content and thermoplastic forming and binding properties makes sodium caseinate and casein unique. This invention provides a new and novel proteinaceous mixture which can be utilized as a substitute for casein and caseinate salts.

SUMMARY OF THE INVENTION

It is an object of this invention to provide a process for producing a proteinaceous mixture having the thermoplastic and binding properties of casein and caseinate salts.

The objects of this invention are accomplished by a process for producing a proteinaceous mixture of modified vegetable protein and unmodified protein, said mixture having properties similar to casein and caseinate salts, said process comprising:

A. making an aqueous slurry of a carbohydrate containing vegetable protein material, said vegetable protein material containing at least about 30 percent by weight protein;
B. fermenting the slurry with yeast to generate carbon dioxide;
C. reacting the carbon dioxide with an alkali metal hydroxide or ammonium hydroxide to form a carbonate, said hydroxide being added in an amount sufficient to adjust the pH of the carbonate containing slurry to from about 7.0 to about 10.5;
D. heating the aqueous slurry to react the carbonate with the protein;
E. adjusting the slurry to a pH of from about 6.0 to about 8.0 by addition thereto of an edible acid or alkali; and
F. admixing from 1-15 parts by weight of the dried pH adjusted slurry with from 1 to 30 parts by weight unmodified proteinaceous material.

Preferably, the process includes a cooling step, say to from room temperature to 130°F., after the heating reacting and prior to pH adjustment.

More preferably, the vegetable protein material of this invention is a solvent extracted oil seed vegetable protein.

Preferably also, the aqueous slurry of this invention has a solids content of about 3 percent to about 20 percent by weight, or a protein content up to about 12 percent by weight.

The preferred hydroxide of this invention is a member selected from the group comprising sodium hydroxide, potassium hydroxide, and ammonium hydroxide.

The preferable reaction temperature of this invention is a temperature of from 280°F. to 370°F. in a closed vessel for 2½ to 5 minutes.

In one single preferred embodiment of this invention, this invention is accomplished by a process for producing a modified vegetable protein having thermoplastic and forming properties similar to casein and caseinate salts, said process comprising:

A. making an aqueous slurry of a carbohydrate containing vegetable protein material; said vegetable protein material containing at least about 30 percent by weight protein; and said slurry containing from about 8-15 percent by weight solids;
B. pasteurizing the slurry by raising the temperature to above 290°F. for at least about 6 seconds and then cooling to a temperature below 100°F.;
C. adding to the cooled, pasteurized slurry from 0.1 to 5.0 percent by weight of the yeast based on the solids content;
D. allowing the innoculated slurry to ferment until a substantial portion of the saccharides have been converted thereby forming carbon dioxide; said fermentation being conducted at a temperature of from 33°F. to 90°F. for a time period of from 4 hours to 96 hours;
E. reacting the carbon dioxide with an alkali metal hydroxide or ammonium hydroxide to form a carbonate; said alkali metal hydroxide or ammonium hydroxide being added in an amount sufficient to adjust the pH of the carbonate containing slurry to from above 7.0 to about 10.5;
F. heating the slurry to a temperature of from 300°-360°F. for a time period of from 1-10 minutes;
G. cooling the slurry to a temperature of from 50°-90°F.;
H. adjusting the pH of the slurry to a pH of from 6.0 to 8.0 by addition thereto of an edible acid or alkali; and
I. admixing from 1-15 parts by weight of the dried neutralized slurry with from 1-30 parts by weight unmodified proteinaceous material.

The first step in this invention requires making an aqueous slurry of a saccharide or polysaccharide containing vegetable protein material with the vegetable protein material containing at least about 50 percent by weight protein. Preferably the protein material is an oil seed, solvent extracted, vegetable protein such as soy protein isolate or soy protein concentrate. Other proteins, however, such as oat protein, have been found to be highly acceptable for use in this invention. Other oil seed vegetable proteins, solvent extracted to concentrate the protein therein are also acceptable, such as peanut and sesame protein and the other oil seed vegetable proteins. It is required that the mixture have at least 30% protein therein and preferable that the protein material have at least about 50 percent by weight protein therein. In other words, the protein material preferably should be concentrated so that it comprises a major portion of protein.

The aqueous slurry is prepared simply by adding the carbohydrate containing proteinaceous material to water and mixing until a slurry is provided. Preferably the slurry is prepared by mixing from 3-16 percent by weight of the proteinaceous material in water and mixing until slurry has occured. This preferably gives an overall protein content in the slurry of up to 12 percent by weight.

The next step in the invention requires fermenting the slurry with yeast to generate carbon dioxide. The fermentation is accomplished by adding carbon dioxide generating yeast to the slurry and reacting it under fermentation conditions to produce carbon dioxide.

For use herein, two particular strains of yeast have been found to be highly desirable. The yeasts *Saccharomyces cerevisiae* A.T.C.C. No. 7752 and *Saccharomyces carlsbergensis* have been found to be highly desirable for use in this invention. After the yeast has fermented the carbohydrates therein and produced carbon dioxide the slurry is preferably heated to pasteurize it and kill the yeast. After this is accomplished the slurry is then preferably cooled and an alkali metal hydroxide or ammonium hydroxide is added to form a carbonate being either an alkali metal carbonate or bicarbonate or ammonium carbonate. The addition of the hydroxide is such as to produce a slurry having a pH of about 7.0 up to about 10.5. After the carbon dioxide has been converted into a carbonate, the mixture is heated to react the carbonate with the protein. The heating must be sufficient to provide a reaction between the carbonate and the protein but must be below the decomposition temperature of the protein. We have found, for instance, a reaction temperature of 330°F. for a time period of from 160–200 seconds produces an acceptable product. We have found a reaction temperature of from 295°F. to 310°F. for from 3½ to 5 minutes produces a good product. Other times and temperatures may also be utilized providing the reaction product, when neutralized, has the same properties as is herein attributed to the above described reaction. It is well within the skill of one knowledgeable in the art to prepare these different products with different reactions in order to arrive at an end product, however, optimum conditions are as stated above. In any condition the temperature should be at least about the boiling point of water up to a point at which degradation of the protein material or reaction product occurs. It is preferable that the reaction be conducted in a closed vessel since this enables heating of the aqueous slurry above the boiling point of water. Generally this will raise the pressure and a reaction pressure of about 90 pounds per square inch is sometimes found.

At this point in the process, it is preferable to cool the reacted mass. This can be accomplished by conventional means to arrive at a temperature of from about room temperature to 130°F.

The next step in this invention requires the adjusting of the pH of the slurry to a pH of from 6.0 to 8.0 by addition thereto of an edible acid or an edible alkali. The neutralization can occur by use of any of the known edible acids or which are normally used as food additives. For instance, hydrochloric acid, citric acid, formic acid, and acetic acid, are all members of the group of edible food grade acids acceptable for use in this invention. If the pH is to be adjusted from the lower to the higher portion of the range, then an alkali is used for the adjustment, such as sodium hydroxide, potassium hydroxide, calcium hydroxide, etc.

The final step in this process requires admixing from 1–15 parts by weight of the neutralized slurry with from 1–30 parts by weight unmodified proteinaceous material. The unmodified proteinaceous material refers to proteinaceous material that is not modified according to the process hereinabove described with relation to modification by hydroxide treatment. The unmodified proteinaceous material may refer to either vegetable proteins or meat proteins. In other words, the unmodified proteinaceous material can refer to the oil seed vegetable proteins that are solvent extracted such as soy flour, soy protein concentrate, soy protein isolate, or it may refer to oat protein, peanut protein, or sesame protein which has been unmodified or it may also refer to meat protein such as meaty materials, or to fish protein such as fish flour or fish meal. In other words the normally accepted usage of the term "proteinaceous material" is acceptable for admixture herewith to produce an acceptable product.

After the mixture of modified and unmodified protein material has been prepared, it may be dried to the extent necessary for use in a food product. If a dry product is desired, it can be dried to below about 15 percent by weight moisture. If the product can tolerate water or needs water for processing, the mixture may be left in the wet state and still have the properties of casein or caseinate salts. When drying is desired, drum drying, spray drying, freeze drying or any of the standard drying techniques can be used.

DESCRIPTION OF THE PREFERRED EMBODIMENTS

This invention may be more fully described but is not limited by the following examples.

EXAMPLE 1

An aqueous slurry of 8 percent by weight defatted soy flour is prepared by mixing the defatted soy flour in water in the appropriate proportion. The yeasts *Saccharomyces cerevisiae* and *Saccharomyces calsbergensis* are added thereto in a closed vessel and the slurry is fermented for 60 hours at 60°F. Sodium hydroxide is added to the mixture until the pH is 8.0. The mixture is then heated to a temperature of 300°F. in a closed vessel for about 4 minutes. After heating, the product is cooled to 120°F. and neutralized by addition thereto of hydrochloric acid until the pH is 6.8. The slurry is then admixed with soy protein concentrate in an amount of 3 parts by weight soy protein concentrate to 1 parts by weight slurry and extruded into a fibrous product having the properties of sodium caseinate.

EXAMPLE 2

Example 1 is repeated with the exception that the hydroxide is potassium hydroxide. Again, an acceptable product is produced.

EXAMPLE 3

Example 1 is repeated except the modified vegetable protein material is oat protein. Again, an acceptable product is produced.

EXAMPLE 4

Example 2 is repeated with the exception that the modified vegetable protein material is oat protein. Again, an acceptable product is produced.

EXAMPLE 5

Example 1 is repeated except the modified vegetable protein material is a mixture of 1 part by weight oat protein and 2 parts by weight soy flour. Again, an acceptable sodium caseinate replacement is produced.

EXAMPLE 6

Example 1 is repeated except the modified vegetable protein material is a mixture of 1 part by weight sesame protein and 3 parts by weight soy flour. Again, an acceptable product is produced.

EXAMPLE 7

Example 1 is repeated except the modified vegetable protein material is a mixture of 1 part by weight peanut protein and 1 part by weight soy flour. Again, an acceptable sodium caseinate replacement is produced.

EXAMPLE 8

Example 2 is repeated except the modified vegetable protein material is a mixture of 1 part by weight sesame protein and 3 parts by weight soy flour. Again, an acceptable product is produced.

EXAMPLE 9

Example 2 is repeated except the modified vegetable protein material is a mixture of 1 part by weight peanut protein and 3 parts by weight soy flour. Again, an acceptable product is produced.

EXAMPLE 10

Example 1 is repeated with the exception that the unmodified protein is ground meat. Again, an acceptable product is produced, in which the binding characteristics of sodium caseinate are found.

EXAMPLE 11

Example 2 is repeated except that the unmodified protein is ground meat. Again, an acceptable product is produced.

EXAMPLE 12

Example 3 is repeated except the unmodified protein is ground meat. Again, an acceptable product is produced.

EXAMPLE 13

Example 4 is repeated except that the unmodified protein is ground meat. Again, an acceptable product is produced.

EXAMPLE 14

Example 5 is repeated except that the unmodified protein is ground meat. Again, an acceptable product is produced.

EXAMPLE 15

Example 6 is repeated except that the unmodified protein is ground meat. Again, an acceptable sodium caseinate replacement is produced.

EXAMPLE 16

Example 7 is repeated except that the unmodified protein is ground meat. Again, an acceptable sodium caseinate replacement is produced.

EXAMPLE 17

Example 8 is repeated except that the unmodified protein is ground meat. Again an acceptable product is produced.

EXAMPLE 18

Example 9 is repeated except that the unmodified protein is ground meat. Again, an acceptable product is produced.

It may be seen that this invention provides a new and novel method for imparting thermoplastic properties to proteinaceous mixtures. The new modified protein has thermal reversibility and the flow properties, gelling properties, and fiber forming ability of caseinate containing products. The modified protein is found to be a highly acceptable substitute for sodium caseinate and casein in food products.

Having fully described this new and unique invention, we claim:

1. A process for producing a proteinaceous mixture of modified vegetable protein and unmodified protein, said mixture having properties similar to casein and caseinate salts, said process comprising:
    A. making an aqueous slurry of a carbohydrate containing vegetable protein material, said vegetable protein material containing at least about 30 percent by weight protein;
    B. fermenting the slurry with yeast to generate carbon dioxide, said fermentation being conducted at a temperature of from 33°F. to 90°F. for from 4 hours to 96 hours, and said yeast comprising a member selected from the group of yeast *Saccharomyces cerevisiae* and *Saccharomyces carlsbergensis*;
    C. reacting the carbon dioxide with an alkali metal hydroxide or ammonium hydroxide to form a carbonate, said hydroxide being added in an amount sufficient to adjust the pH of the carbonate containing slurry to from about 7.0 to about 10.5 said hydroxide being reacted with the carbon dioxide while in slurry;
    D. heating the aqueous slurry to react the carbonate with the protein said reacting occurring after the carbonate is created in situ;
    E. neutralizing the slurry to a pH of from 6.0 to 8.0 by addition thereto of an edible acid or edible alkali; and
    F. admixing from 1–15 parts by weight of the neutralized slurry with from 1–30 parts by weight unmodified proteinaceous material.

2. A process as in claim 1 wherein the vegetable protein material is a solvent extracted oil seed vegetable protein.

3. A process as in claim 1 wherein the aqueous slurry has a solids content of from about 3 percent to 20 percent by weight.

4. A process as in claim 1 wherein the aqueous slurry has a protein content of up to 12 percent by weight.

5. A process as in claim 1 wherein the hydroxide is a member selected from the group sodium hydroxide, potassium hydroxide, and ammonium hydroxide.

6. A process as in claim 1 wherein the heating step comprises heating the mixture to a temperature of from 260°F. to 370°F. in a closed vessel for from 2 to 5 minutes.

7. A process as in claim 1 wherein the vegetable protein material is defatted soy flour.

8. A process as claim 1 wherein the vegetable protein material is oat protein.

9. A process as in claim 1 wherein the product is partially dried after the last mixing step.

10. A process for producing a proteinaceous mixture of modified vegetable protein and unmodified protein, said mixture having thermoplastic and forming properties similar to casein and caseinate salts, said process comprising:
- A. making an aqueous slurry of a carbohydrate containing vegetable protein material, said vegetable protein material containing at least about 30 percent by weight protein;
- B. fermenting the slurry with yeast to generate carbon dioxide, said fermentation being conducted at a temperature of from 33°F. to 90°F. for from 4 hours to 96 hours, and said yeast comprising a member selected from the group of yeast *Saccharomyces cerevisiae* and *Saccharomyces carlsbergensis;*
- C. reacting the carbon dioxide with an alkali metal hydroxide or ammonium hydroxide to form a carbonate, said hydroxide being added in an amount sufficient to adjust the pH of the carbonate containing slurry to from about 7.0 to about 10.5 said hydroxide being reacted with the carbon dioxide while in slurry;
- D. heating the aqueous slurry to react the carbonate with the protein said reacting occurring after the carbonate is created in situ;
- E. cooling the reacted protein slurry to a temperature below about 130°F.;
- F. adjusting the pH of the slurry to a pH of from about 6.0 to 8.0; and
- G. admixing from 1-parts by weight of the pH adjusted slurry with from 1-30 parts by weight unmodified proteinaceous material.

11. A process for producing a modified vegetable protein having properties similar to casein and caseinate salts, said process comprising:
- A. making an aqueous slurry of a carbohydrate containing vegetable protein material; said vegetable protein material containing at least about 30 percent by weight protein; and said slurry containing from about 8-20 percent by weight solids;
- B. pasteurizing the slurry by raising the temperature to above 290°F. for at least about 6 seconds and then cooling to a temperature below 65°F;
- C. adding to the cooled, pasteurized slurry from 0.1 to 5.0 percent by weight yeast, said yeast comprising a member selected from the group of yeasts *Saccharomyces cerevisiae* and *Saccharomyces carlsbergensis;*
- D. allowing the innoculated slurry to ferment ferment until a substantial portion of the soluble saccharides have been converted thereby forming carbon dioxide; said fermenting being conducted at a temperature of from 33°F. to 90°F. for a time period of from 4 to 96 hours;
- E. reacting the carbon dioxide with an alkali metal hydroxide of ammonium hydroxide to form a carbonate; said alkali metal hydroxide or ammonium hydroxide being added in an amount sufficient to adjust the pH of the carbonate containing slurry to from about 7.0 to about 10.5;
- F. heating the slurry to a temperature of from 300° to 360°F. for a time period of from 1 to 10 minutes;
- G. cooling the slurry to a temperature of from 50° to 90°F.;
- H. adjusting the pH of the slurry to a pH of from 6.0 to 8.0 by addition thereto of an edible acid or edible alkali; and
- I. admixing from 1-15 parts by weight of the pH adjusted slurry with from 1-30 parts by weight unmodified proteinaceous material.

12. A process as in claim 11 wherein the mixture of pH adjusted slurry and unmodified proteinaceous material is dried to a moisture content below 15 percent by weight.

* * * * *

UNITED STATES PATENT OFFICE
CERTIFICATE OF CORRECTION

PATENT NO. : 3,912,820
DATED : October 14, 1975
INVENTOR(S) : Keith L. Chandler, Roy G. Hyldon, and John P. O'Mahony It is certified that error appears in the above-identified patent and that said Letters Patent are hereby corrected as shown below:

Claim 10, column 7, line 30, after "from 1-", insert --15--.

Signed and Sealed this twentieth Day of January 1976

[SEAL]

Attest:

RUTH C. MASON
*Attesting Officer*

C. MARSHALL DANN
*Commissioner of Patents and Trademarks*